April 14, 1942.   F. J. WESTROPE   2,279,806
FRAME CONSTRUCTION FOR VEHICLE BODY ESPECIALLY FOR OVER-ENGINE CAB
Filed Aug. 17, 1939   3 Sheets-Sheet 1
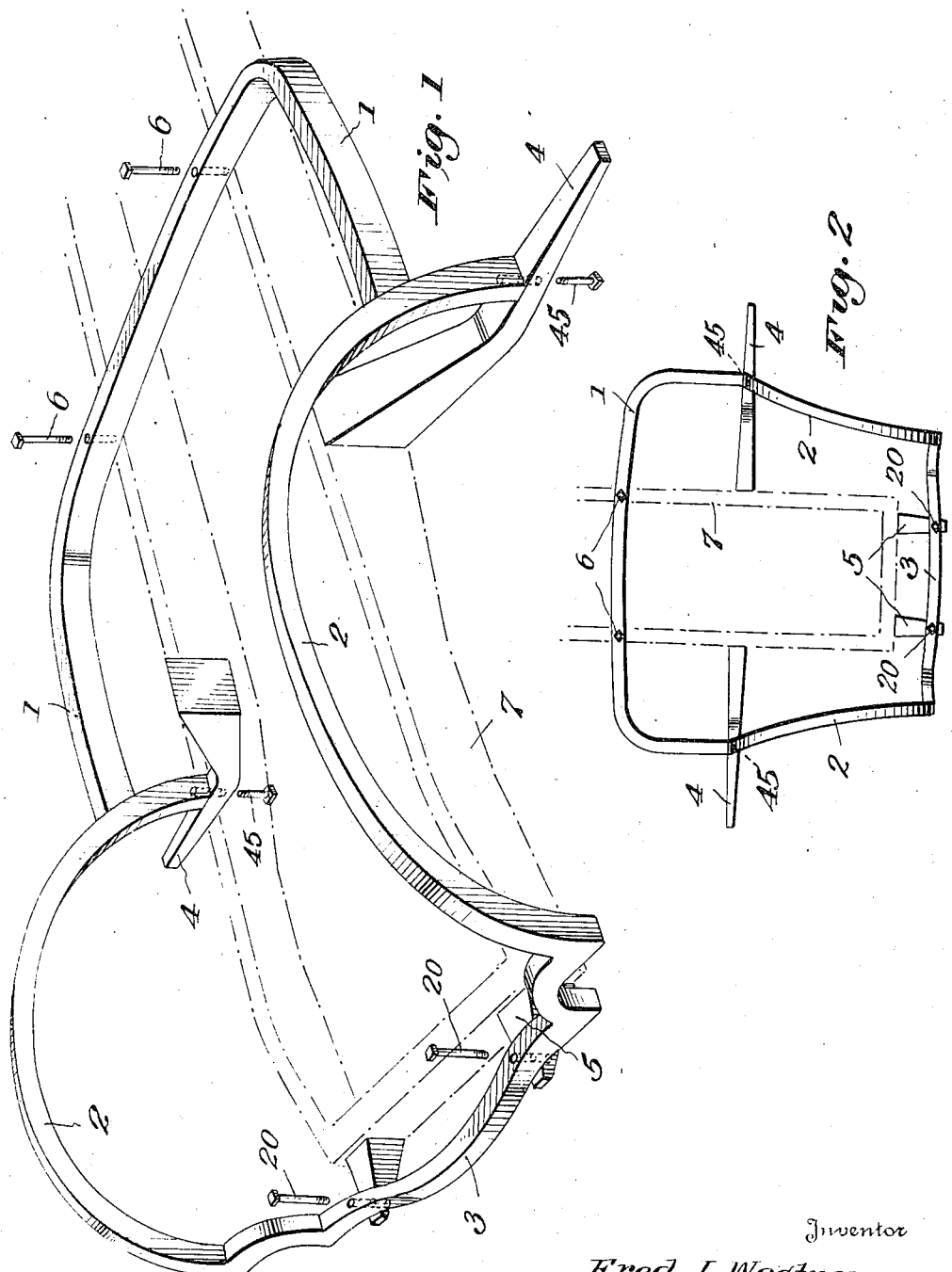
Inventor
Fred J. Westrope
By John P. Tarbox
Attorney

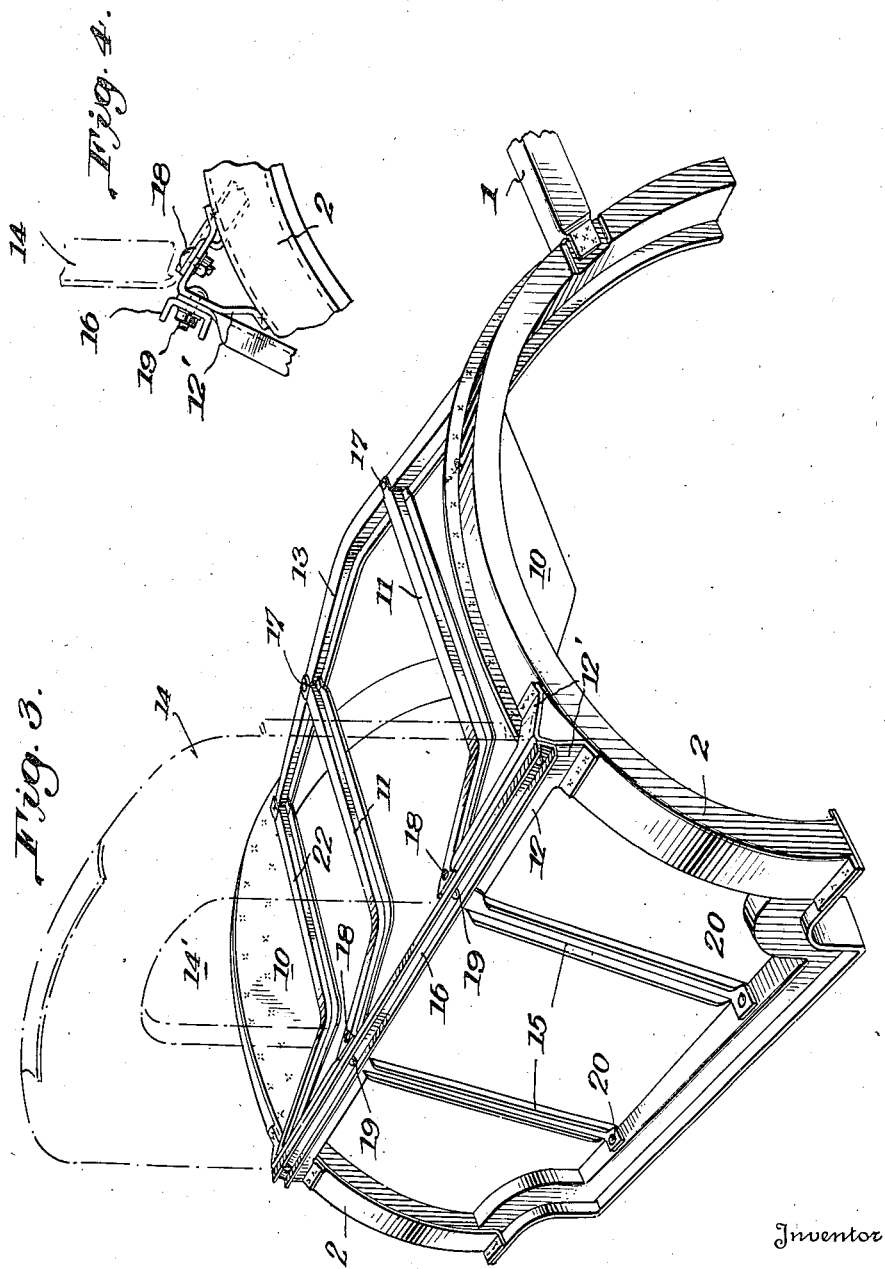

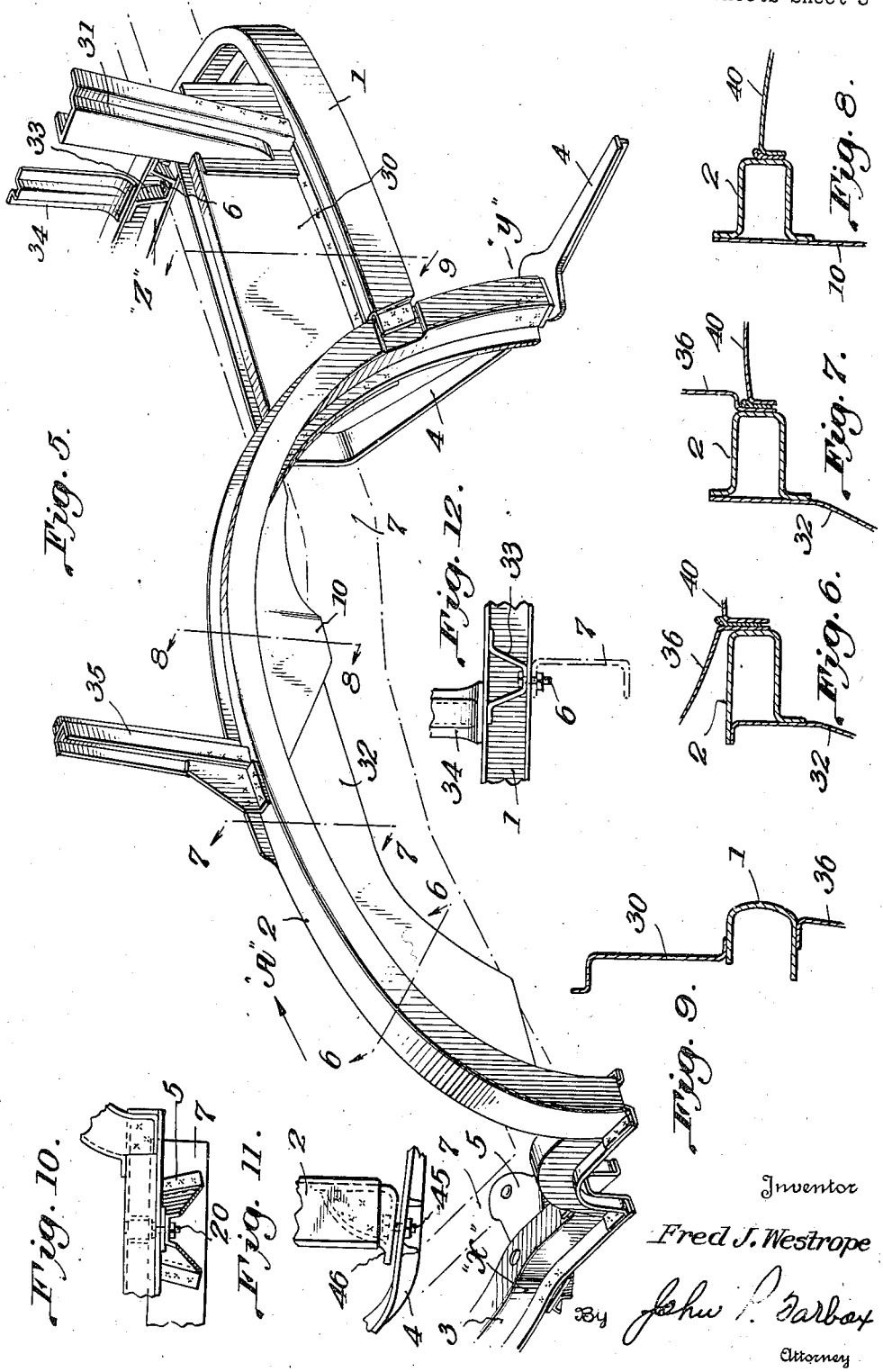

Patented Apr. 14, 1942

2,279,806

UNITED STATES PATENT OFFICE 2,279,806

FRAME CONSTRUCTION FOR VEHICLE BODIES, ESPECIALLY FOR OVER-ENGINE CAB

Fred J. Westrope, Pleasant Ridge, Mich., assignor to Edward G. Budd Manufacturing Company, Philadelphia, Pa., a corporation of Pennsylvania Application August 17, 1939, Serial No. 290,535

16 Claims. (Cl. 180—89)

This invention relates to vehicles and vehicle construction, and is more particularly directed to improvements in motor-vehicles, such as trucks and commercial carriers, of those types in which the operator is seated within an enclosure or cab.

More particularly, the invention has to do with the construction of vehicle cabs of those types wherein the engine is within the area of the cab. More recently, such vehicles have been termed cab-over-engine vehicles and they include those vehicles in which a multi-cylinder engine is compactly in-built into the cab confines of a truck or van in order to provide ready access to said engine and an improved operator's seat disposition.

As is well known, in the conventional truck designs, it has been the standard practice to mount the cab upon the frame of the chassis, the cab being mounted rearwardly of the engine and front wheel housings so that the operator would peer out from the cab over the usual engine hood. To the rear of the cab, the truck body would be mounted upon the frame of the chassis.

However, modern transportation demands that trucks be so built that despite the fact that the overall length of the vehicle be kept as usual, the portion of the truck devoted to the pay-load must be increased. Therefore, the most obvious solution to such a problem is to increase the pay-load space by moving the operator's cab forwardly of the vehicle and to accomplish this the cab should include substantially within its confines, the engine, and rearwardly of the engine, the operator's seat. However, in order to do this certain changes must be made in the cab frame so that in moving the cab forwardly, no difficulties will be encountered in the region of the front wheel housings. To some extent, most of these difficulties have been solved by structures forming part of the prior art, and cab-over-engine vehicle constructions are not entirely new at this date.

This invention, however, while concerned with cab-over-engine types of vehicles generally, is more concerned with the provision of a means for mounting a relatively broad cab body upon a standard narrow chassis frame without the danger of racking such a body to pieces within a short space of time.

A further object of the invention is to adapt the cab to chassis frames of any dimension or design by means of two pairs of laterally extending brackets of suitable design and connected to the chassis frame at an intermediate point.

Another object is to provide a structure wherein only one pair of body hold-down bolts secures the structure directly to the chassis frame.

The invention also contemplates a body frame forming a closed figure, said frame extending laterally beyond the chassis sills and only the body sills are curved upwardly in the region of and to surround the front wheel housings.

Another object is to provide a body underframe resting by front and rear cross members upon the chassis sills.

Another object is to provide a structure wherein the front cross member of the body underframe rests on and is secured to brackets attached to the chassis frame.

Another object is to so shape the wheel housing bow of the body underframe so that it will bow downwardly and rest on a bracket secured to each of the chassis side sills.

A still further object of the invention rests in the fact that the structure forms a completely closed welded or integral frame as the basis for the cab body.

Other objects and advantages of the invention will become apparent as the description proceeds.

In the accompanying drawings, a preferred embodiment of the invention is illustrated, said embodiment showing a vehicle in which provision is made for locating the engine within the confines of the cab.

In the drawings:

Figure 1 is a perspective diagram showing the basic cab-understructure and its adaptation to a chassis frame;

Figure 2 is a plan view of the cab-understructure, looking down on Figure 1;

Figure 3 is a detail view of the removable floor structure of the cab and one of the cab cross members;

Figure 4 is a detail view showing how the interbracing of members at a particular point in Figure 3 is made possible;

Figure 5 is a detailed presentation of a part of the body sill structure shown in Figure 1, and shows the actual shapes of its members;

Figure 6 is a sectional view taken on line 6—6 of Figure 5;

Figure 7 is a sectional view taken on line 7—7 of Figure 5;

Figure 8 is a sectional view taken on line 8—8 of Figure 5;

Figure 9 is a sectional view taken on line 9—9 of Figure 5;

Figure 10 is a sectional view at portion X of Figure 5 considered as seen in the direction of the arrow which is parallel to the centerline of the body structure of Figure 5;

Figure 11 is a sectional view at portion Y of Figure 5 viewed in the direction of the arrow as in Figure 10; and Figure 12 is a sectional view at portion Z of Figure 5 viewed in the direction of the arrow as in Figure 10.

Referring now to the drawings in detail, in which similar characters of reference are employed to designate like parts in the several views, the cab body sill structure basically, and to show the outline thereof, may be considered when viewing Figure 1, as being made of single metal members including the rear body sill 1, a wheel arch member and a front tie bar member, all welded or integrally united to each other, forming a strong foundation structure for all other parts and panel members of the cab body and the fenders. The cab per se is not shown since the units thereof may be built and joined together and united to the body sill in a manner not new with applicant and as well known in the art.

Adaptation of the body sill members to the chassis frame 7 of any dimension or design is accomplished by means of two pairs of brackets of suitable design, such as 4 and 5. Only one pair of body hold-down bolts 6 secures the structure through the rear body sill 1 directly to the chassis frame 7. Other bolts 20 secure the structure to the brackets 5 at the front of the chassis frame. The chassis frame 7 is of any standard type employed for truck use and forms no part of this invention. The brackets 4 serve to support the cab body sill members and the running boards (not shown). It will be seen that in plan view, the body sill in the region of the rear quarter is U-shaped and in side view, the wheel arches of the body sill are bowed downwardly or somewhat U-shaped. Therefore, the body sill structure forms a closed figure extending laterally beyond the chassis sills and parts of the body sill structure are curved to surround the front wheel housings. The body sill structure rests upon the chassis sills only by virtue of member 1 and upon the brackets 5 by virtue of member 3. Therefore, it can truly be said that a portion only of the body sill bears directly upon the chassis sills and a principal feature of this invention rests in the fact that the structure previously described forms a completely closed, welded circle, so to speak, as the basis for the body sill and that hereby is provided a means of mounting a relatively broad body upon a narrow chassis without the danger of racking such a body to pieces.

Figure 3 relates to the removable floor structure and to the cross members employed. As shown, the various members are made up of stampings and therein take on the practical forms or shapes found in the art, but in assembled relation, they conform absolutely to the basic configuration of the structure shown in Figure 1. The entire floor structure and one frame cross member are so designed as to combine sound structural bracing with easy demountability. This is an important feature as it facilitates greatly all major servicing of the engine in this type of cab body.

In Figure 3, 10 are the floor and toe board support panels, made of metal stampings rigidly secured to the wheel arch members 2 and to the supporting membrs 22. Members 11 are the floor and engine cover supports. 12 are the dash to wheel arch bracket members, rigidly secured to the wheel arch members 2 by spot welding as shown. 13 is a metal channel member shaped as shown and constitutes the floor and seat riser support. The dash panel, forming no part of this invention, is shown at 14, with the opening 14' therein, to the marginal edges of which the engine cover is secured, said engine cover being within the cab proper and forms a tunnel within which is the engine. 15 are metal braces extending from the dash to the front tie bar member 3. 16 is the wheel arch front cross member, about which more will be said. 17 are the floor support bolts in the rear and 18 are the floor support bolts in the front. 19 are the bolts which secure the cross member 16 and the dash together. 20 are the bolts which secure members 15 to the member 3. By looking at the assembly in Figure 3, it will be seen that members 10, 22, 12, 2, 13, 3, and 14 are permanently parts of the cab structure because they are spot welded and riveted together wherever joinder is necessary. These members support and are in turn braced and strengthened by the members of the floor structure, which consists of the floor and toe boards (not shown) plus metal members 11, 15, and 16. Members 11, 15 and 16 are assembled into the whole by means of the bolts 17, 18, 19, and 20, thus making complete removal of these parts an easy matter, yet assuring great structural strength when in place. In other words, when the engine needs to be serviced, the toe and floor boards and members 11, 15, and 16 are entirely removed, without in any way weakening the principal cab sill structure.

Figure 4 illustrates the effective interbracing of the members made possible by the arrangement above described, assuring the utmost in structural resistance from the member 16, along its entire length. It is apparent that the members 12, shaped as shown, act merely as supporting brackets for members 22 and 11 and are bridged by the member 16, which member is removable by removing bolts 19. The bracket member 12 has supporting legs 12' which are spot welded to the wheel arch member 2.

In building up a cab, it is preferable to start with the assembly of an understructure or skeletonized subframe of the kind detailed in Figs. 5 to 12, which is symmetrically arranged with respect to the chassis frame center-line, in line with the arrow A, Figure 5. Such heavily reinforced framework is intended to uphold a substantial portion of the cab superstructure and as such comprises a sill structure which is primarily composed of channel members 1, 2, and 3, spot welded to each other. These channels are boxed in and reinforced by filler members 30 running from the members 2 to the door lock pillars 31; by the floor and toe board supporting panels 10; by the fender skirt filler members 32, and by the body sill reinforcement members 33, rear, and together they form a strong foundation to which all strainers, such as 34, pillars such as 31 and 35 and body panels such as 36 are spot welded.

As evidenced by Figs. 6, 7, and 8, the arch member 2 changes in certain sections, such as 6—6, 7—7, 8—8. In Fig. 6, the box channel has its mouth closed by the fender skirt filler 32 and the channel has secured thereto the body panel 36 and the fender 40. In Figure 7, the box channel has its mouth closed by the filler 32 and the channel has secured thereto the panel 36 and the fender 40. In Figure 8, the box channel has its mouth closed by the toe board supporting panel 10 and the channel has secured thereto the fender portion 40. Figure 9, taken on line 9—9 shows the filler member 30 secured to the channel member 1 and depending from the channel member is a portion of the body panel 36. No attempt has been made to show how the body panels are united to each other and to the body sill structure since there are many ways of performing these operations, all of which are taught by the prior art.

It is also shown by means of Figs. 10, 11, and 12 how the body sill structure is mounted upon the chassis frame 7 by means of brackets 4 and 5 and secured by hold-down bolts 6, 20, and 45. Bracket 4 is secured to the chassis 7 as shown. The securing means 46 is spot welded to the end of member 2 and then bolted to bracket 4 by means of bolt 45. The extension of bracket 4 is to accommodate the usual running board. The brackets 5 are riveted to the chassis frame 7 and upon the brackets the sill member 3 is caused to rest, being demountably secured thereto by means of the bolts 20.

The body sill portion 1, where it joins with the members 2 is spot welded in the area of contact.

While the invention has been described as it may be applied to or embodies in a truck, it will be entirely clear that it may also be advantageously utilized in the construction and operation of other types of vehicles, as omnibusses, and passenger cars, which, with the present trends to new design, may conform to this invention. Also, various changes in the arrangement of the structural elements entering into the invention and in the elements themselves may be effected, within the spirit and scope of this invention.

I claim:

1. In an underframe construction for a vehicle cab such as an over-engine cab, a sill member U-shaped in plan view having its central portion extending transversely to the longitudinal direction of the cab and the two arms extending forwardly, a second transverse sill member spaced from and forwardly of said first named sill member and a pair of lateral sill members having their ends downwardly bowed and being connected to the ends of said arms and of said second sill member to form a closed frame.

2. In an underframe construction for a vehicle cab such as an over-engine cab, a rearmost transverse sill membr, a foremost transverse sill member being spaced from and shorter in transverse direction than said rearmost member and a pair of lateral sill members having their ends downwardly bowed and being connected to the ends of said transverse sill members to form a closed frame, said bowed members converging toward the front end of the cab.

3. In an underframe construction for a vehicle cab such as an over-engine cab, a rearmost transverse sill member, a foremost transverse sill member spaced from said rearmost member and lying in a horizontal plane below that of said rearmost sill member and a pair of lateral sill members having their ends downwardly bowed and being connected to the ends of said transverse sill members to form a closed frame.

4. In an underframe construction for a vehicle cab such as an over-engine cab, a rearmost transverse sill member, a foremost transverse sill member spaced from said rearmost member and a pair of lateral sill members having their ends downwardly bowed, said lateral members being shaped to provide wheel housing supports and being connected to the ends of said transverse sill members to form a closed frame, and additional substantially straight transverse members extending between and being fastened to the bowed members in a region between the ends of the latter as to form a skeleton framework around a space which is adapted to receive a vehicle engine.

5. In an underframe construction for a vehicle cab such as an over-engine cab, a rearmost transverse sill member, a foremost transverse sill member spaced from said rearmost member, a pair of lateral sill members having their ends downwardly bowed, said lateral members being shaped to provide wheel housing supports and being connected to the ends of said transverse sill members to form a closed frame, and transverse floor and toe board supporting members secured to both said bowed members intermediate the ends thereof and at a level higher than said rear end front transverse sill members.

6. In a frame construction, a rearmost transverse sill member, a foremost transverse sill member spaced from said rearmost member, a pair of lateral sill members having their ends downwardly bowed, said lateral members being shaped to provide wheel housing supports and being connected to the ends of said transverse sill members to form a closed frame, and transverse floor and toe board supporting members secured to said downwardly bowed members and extending uninterruptedly from one side of the underframe to the other, thereby forming a structure in which the floor and toe boards are directly above said wheel housings.

7. In a cab underframe construction of the cab-over-engine type, in which the cab underframe is supported by a chassis frame, that improvement which consists in providing a rearmost transverse sill member, a foremost transverse sill member spaced from said rearmost member, and downwardly bowed members connected to the ends of said transverse sill members to form a closed frame, resting by said transverse members upon longitudinally extending portions of the chassis framework.

8. In a cab underframe construction of the cab-over-engine type, in which the cab underframe is supported by a chassis frame, that improvement which consists in providing a rearmost transverse sill member, a foremost transverse sill member spaced from said rearmost member, and a pair of lateral sill members having their ends downwardly bowed, said lateral members being connected to the ends of said transverse sill members to form a closed frame, said frame resting by said foremost transverse sill member on brackets projecting forwardly from said chassis frame and by said rearmost transverse sill member on the side sills of said chassis frame, one point of each of said bowed members resting on a laterally outwardly projecting bracket secured to each of said chassis side sills at a point intermediate said transverse sill members.

9. In a cab underframe construction of the cab-over-engine type, in which the cab underframe is supported by a chassis frame, that improvement which consists in providing a rearmost transverse sill member, a foremost transverse sill member spaced from said rearmost member, a pair of lateral sill members having their ends downwardly bowed, said lateral members being shaped to provide wheel housing supports and being connected to the ends of said transverse sill members to form a closed frame, transverse floor and toe board supporting members secured to said bowed members, said closed frame resting by said foremost transverse sill member on brackets projecting forwardly from said chassis frame and by said rearmost transverse sill member on the side sills of said chassis frame, one point of each of said bowed members resting on a laterally outwardly projecting bracket secured to each of said chassis side sills at a point intermediate said transverse sill members.

10. In a cab underframe construction of the cab-over-engine type, in which the cab underframe is supported by a chassis frame of less transverse width than said cab underframe, that improvement which consists in providing a rearmost transverse sill member, a foremost transverse sill member spaced from said rearmost member, a pair of lateral sill members having their ends downwardly bowed, said lateral members being shaped to provide wheel housing supports and being connected to the ends of said transverse sill members to form a closed frame, transverse floor and toe board supporting members secured to said bowed members, said closed frame resting by said foremost transverse sill member on brackets projecting forwardly from said chassis frame and by said rearmost transverse sill member on the side sills of said chassis frame, one point of each of said bowed members resting on a laterally outwardly projecting bracket secured to each of said chassis side sills at a point intermediate said transverse sill members.

11. A cab underframe construction as a self-contained multiple unit structure adapted to be mounted as such upon a standard vehicle chassis, that is a chassis frame having two sills which are transversely spaced from one another and arranged between the vehicle wheels, said structure comprising a rearmost transverse sill member, a foremost transverse sill member spaced from said rearmost member and a pair of lateral sill members having their ends downwardly bowed and being connected to the ends of said transverse sill members.

12. A cab underframe construction as a self-contained multiple unit structure adapted to be mounted as such upon a standard vehicle chassis, that is a chassis frame having two sills which are transversely spaced from one another and arranged between the vehicle wheels, said structure comprising a rearmost transverse sill member, a foremost transverse sill member spaced from said rearmost member, a pair of lateral sill members having their ends downwardly bowed, said lateral members being shaped to provide wheel housing supports and being connected to the ends of said transverse sill members and transverse floor and toe board supporting members secured to said bowed members.

13. In a cab underframe construction of the cab-over-engine type being adapted to have an engine mounted under said cab and in which the cab underframe is supported by a chassis frame, that improvement which consists in providing a rearmost transverse sill member, a foremost transverse sill member spaced from said rearmost member, a pair of lateral sill members having their ends downwardly bowed, said lateral members being shaped to provide wheel housing supports and being connected to the ends of said transverse sill members to form a closed frame, a pair of transverse floor and toe board supporting members secured in spaced relation to said bowed members, one of said supporting members being permanently secured to said bowed members and constituting a floor and seat riser support, the other of said supporting members being demountably secured to said bowed members and constituting a toe board support, a plurality of spaced members at right angles to said toe and floor board supporting members and secured thereto and constituting additional supports for said toe and floor boards, those additional supports and said demountable toe board support being demountable to gain access to the space under said cab which space is adapted to house an engine.

14. In a cab underframe construction of the cab-over-engine type being adapted to have an engine mounted under said cab and in which the cab underframe is supported by a chassis frame, that improvement which consists in providing a rearmost transverse sill member, a foremost transverse sill member spaced from said rearmost member, a pair of lateral sill members having their ends downwardly bowed, said lateral members being shaped to provide wheel housing supports and being connected to the ends of said transverse sill members to form a closed frame, a pair of transverse floor and toe board supporting members secured in spaced relation to said bowed members, one of said supporting members being permanently secured to said bowed members and constituting a floor and seat riser support, the other of said supporting members being demountably secured to said bowed members and constituting a toe board support, a plurality of spaced members at right angles to said toe and floor board supporting members and secured thereto and constituting additional supports for said toe and floor boards, a pair of bracing members demountably secured to said foremost transverse sill member and to said demountable toe board support, those additional supports, said demountable toe board support and said pair of bracing members being demountable to gain access to the space under said cab which space is adapted to house an engine.

15. In a motor vehicle, a chassis frame having side members, a body such as an over-engine cab on said chassis frame and extending beyond the front end thereof, separately manufactured bracket members secured to the front end of said chassis frame and extending beyond the latter, and a body cross bar being secured to and supported by portions of said bracket members which portions are forwardly spaced from the front end of the chassis frame proper.

16. In a motor vehicle, a chassis frame having side members, a body such as an over-engine cab on said chassis frame and extending beyond the front end thereof, separately manufactured bracket members secured to the front end of said chassis frame and extending beyond the latter, and a body cross bar being secured to and supported by portions of said bracket members which portions are forwardly spaced from the front end of the chassis frame proper, a second body cross bar being rearwardly spaced from the front end of the chassis frame and resting directly on the upper face of the side members of the chassis frame.

FRED J. WESTROPE.